United States Patent [19]

Milford

[11] 4,315,246
[45] Feb. 9, 1982

[54] DOCUMENT CHARACTER RECOGNITION SYSTEM FOR IDENTIFYING MAGNETIC INK CHARACTERS ON BANK CHECKS AND THE LIKE

[75] Inventor: Richard E. Milford, Oklahoma City, Okla.

[73] Assignee: Magnetic Pheripherals, Inc., Oklahoma City, Okla.

[21] Appl. No.: 56,720

[22] Filed: Jul. 11, 1979

[51] Int. Cl.³ .............................................. G06K 9/00
[52] U.S. Cl. ............................. 340/146.3 D; 235/449; 235/454
[58] Field of Search ............... 340/146.3 C, 146.3 D, 340/146.3 R, 146.3 Z; 235/449, 440, 454, 462

[56] References Cited

U.S. PATENT DOCUMENTS

| 3,092,809 | 6/1963 | Merritt et al. | 340/146.3 C |
| 3,432,032 | 3/1969 | Curphey et al. | 340/146.3 R |
| 3,612,835 | 10/1971 | Andrews et al. | 235/454 |
| 3,764,978 | 10/1973 | Tyburski et al. | 340/146.3 D |
| 3,764,980 | 10/1973 | Dansac et al. | 340/146.3 D |
| 3,876,981 | 4/1975 | Welch | 340/146.3 D |
| 3,895,350 | 7/1975 | De Vries | 340/146.3 D |
| 3,938,089 | 2/1976 | McGregor et al. | 340/146.3 D |
| 3,941,982 | 3/1976 | Knollenberg et al. | 340/146.3 MA |
| 3,949,363 | 4/1976 | Holm | 340/147.3 C |
| 4,032,887 | 6/1977 | Roberts | 340/146.3 D |

FOREIGN PATENT DOCUMENTS 1182713 3/1970 United Kingdom ........ 340/146.3 R

Primary Examiner—Leo H. Boudreau
Attorney, Agent, or Firm—Edwin H. Crabtree

[57] ABSTRACT

A character recognition system for selectively reading and identifying a plurality of characters printed in magnetic ink on a first document and a second document. The documents being bank checks and the like. The system used with reader/sorter equipment for delivering data to an on-line computer. The system characterized by the ability to store all of the character codes of the magnetic ink characters on the documents, compare the character codes and logically edit the codes. The result of the system provides the reader/sorter equipment with a superior performance due to fewer rejects and misread characters.

6 Claims, 3 Drawing Figures

DOCUMENT CHARACTER RECOGNITION SYSTEM FOR IDENTIFYING MAGNETIC INK CHARACTERS ON BANK CHECKS AND THE LIKE

BACKGROUND OF THE INVENTION

This invention relates generally to a character recognition system, and more particularly, but not by way of limitation, to a character recognition system for bank checks and the like using optical character recognition, i.e. OCR, and magnetic ink character recognition, i.e. MICR, techniques to read a plurality of characters on the checks and logically edit the character codes.

Bank checks and other documents are often imprinted with magnetic ink to form characters which can be read electronically using either MICR or OCR techniques or both. Reader/sorter equipment is employed to read the characters on the documents and sort the documents in a prescribed order dependent on the information obtained in reading each of the characters. If a character cannot be read for one reason or another, the document is rejected and read by an equipment operator. However, since reader/sorter equipment ordinarily reads and sorts a large number of documents at a high rate of speed, it is necessary to maintain the rejection rate as low as possible to maintain overall system efficiency.

There are numerous reasons why characters are misread or rejected when read either magnetically or optically. For example, non-uniform magnetic particle distribution within the ink area may cause erroneous reading of a character when read magnetically. Also, bank stamps, marks, dirt and other extraneous visual printing on the document may cause errors in reading the character optically. Blurred characters may be misread or rejected both optically and magnetically depending on the extent and nature of the blur.

Heretofore prior art patents have disclosed systems to read characters both magnetically and optically. The results of the reading is compared and the probable character is logically selected based upon the results of the reading and compare. Examples of these systems may be found in U.S. Pat. No. 3,764,978 to Tyburski, et al; U.S. Pat. No. 3,876,981 to Welch; and U.S. Pat. No. 3,949,363 to Holm. Also U.S. Pat. No. 3,764,980 to Dansac, et al, while employing OCR techniques, provides redundant recognition to reduce rejection of the reading.

One significant problem associated with the prior art recognition systems, and particularly those systems employing redundant character recognition, is that prior techniques have operated on the assumption that there is an exact correspondence between the number of characters read in one mode, for example MICR and the number of characters read in another mode, for example OCR. However, it has been found that the presence of extraneous matter on a document, i.e. marks, dirt and non-magnetic ink, the latter occurring from endorsement stamps, hand-written signatures, printed check backgrounds, etc. can cause the OCR reader to sense extraneous characters not truly present in the data to be read. Hence a principal reason for failure of the prior redundant character recognition systems arose simply from the fact that there were more characters read from the OCR reader than by the MICR reader.

Another problem with prior art redundant character recognition systems resulted from the fact that as each character was read in the two or more modes, the recognition circuitry would select the probable results for inclusion in the final output. Thus, if a line of characters are read, character recognition is accomplished on each character independently of the result accomplished on adjacent characters. A reject of one character read will reject the entire document. However, circumstances may exist that certain of the characters may be logically derived from adjacent characters so that rejection of the reading of one character need not cause the entire document to be rejected.

The invention described herein recognizes the above problems of the prior art character recognition systems and solves these problems accordingly.

SUMMARY OF THE INVENTION

The character recognition system provides reader/sorter equipment with means for greatly reducing the reject rate of the documents read and the misreading of magnetic ink characters thereby increasing the overall efficiency of the equipment and improving operating costs.

The subject invention provides magnetic ink character reading of a plurality of characters on a first and second document and thereafter logically edits the data represented by all of the characters on each document rather than a character by character basis.

The system provides a dual character reader having edit logic capable of sorting out and eliminating for consideration extraneous markings.

The character recognition system further provides the provision of a document presence sensor adjacent the document transport to detect the presence of each of the documents and provide selective enabling of the MICR and OCR read heads.

The system permits the elimination of false OCR character data read on the documents such as bank endorsement stamps, hand-written signatures, printed check backgrounds, etc.

The character recognition system for selectively reading and identifying a plurality of characters printed in magnetic ink on a first document and a second document includes a document presence sensor and control disposed adjacent a document transport mechanism which transports the documents thereon. MICR and OCR read heads and recognition circuits are disposed downstream from the document presence sensor and adjacent the transport mechanism for reading the magnetic ink characters thereon.

The outputs of the MICR and OCR recognition circuits forward character codes inputted into a memory section containing a two stage MICR buffer and a two stage OCR buffer. Each buffer section is capable of storing all of the characters read from one document. The character codes are outputted from the memory usually by alternating read out between one of the MICR buffer sections and one of the OCR buffer sections. Therefore, a character code indicative of an MICR read character will usually be adjacent a character code indicative of an OCR read character. Both of the codes will theoretically represent the same character. Character codes are then forwarded to a shift register for operation by edit logic to compare, reject or skip characters and provide output data representative of the characters read on the documents. The two stage MICR buffer and two stage OCR buffer allows the characters of the first document to be outputted to the register while the characters of the second document are inputted into the alternate buffers. By having the two stage MICR buffer and OCR buffer section in the memory, all of the characters of successive documents to be read can be alternately stored in the memory and outputted to the register for logic editing.

DETAILED DESCRIPTION OF THE DRAWINGS

Figure 1:
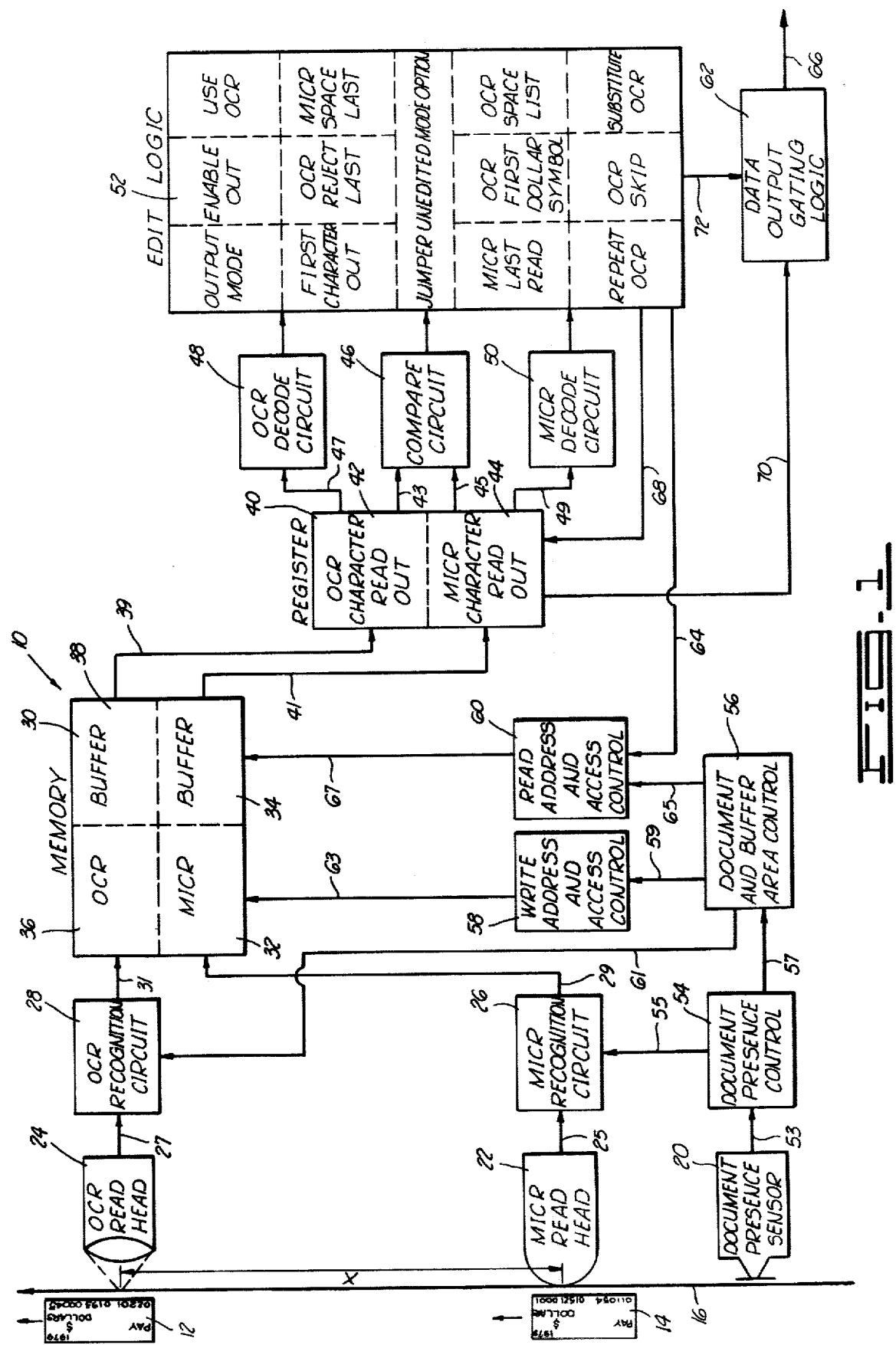
FIG. 1 is a block diagram of the character recognition system.

In FIG. 1 a block diagram of the document character recognition system is illustrated and identified by general reference numeral 10. The system 10 is used for reading magnetic ink characters printed in magnetic ink on a first document 12 and a second document 14 conveyed on a document transport mechanism which is not shown but represented by arrow 16. While only documents 12 and 14 are shown it can be appreciated that the system 10 is used for reading at high speed a plurality of documents such as bank checks and the like transported by the document transport mechanism 16 used with reader/sorter equipment.

The documents 12, 14 and each successive document, travel past a document presence sensor 20, a magnetic ink character recognition, i.e. MICR read head 22 and an optical character recognition, i.e. OCR read head 24. The heads 22 and 24 are spaced at a distance indicated as X. This distance X is predetermined so that a time delay occurs between the reading of the characters on the document by the MICR read head 22 and OCR read head 24.

The MICR read head 22 reads the magnetic ink characters to be identified and forwards a MICR identifying character signal via line 25 to a MICR recognition circuit 26. Similarly OCR read head 24 detects the configuration of the magnetic ink character optically and forwards an OCR identifying character signal via line 27 to an OCR recognition circuit 28.

The characters on the documents 12, 14 and each succeeding document are preferably in a predetermined standard such as E13B font so that recognition circuits 26 and 28 identify the character from the incoming signal in accordance with patterns expected for known characters. These characters include, for example, ten E13B numeric characters, four E13B symbols, one reject or can't read code and one space or missing digit code. MICR recognition circuit 26 and OCR recognition circuit 28 each produce a binary character code representative of the character identified for inputting into a memory 30 via lines 29 and 31.

The memory 30 is divided into four buffer sections. Sections 32 and 34 receive character codes from the MICR recognition circuit 26 while sections 36 and 38 receive character codes from the OCR recognition circuit 28.

Each buffer section 32, 34, 36 and 38 of the memory 30 have the capacity to store character codes representing all of the characters read from a single document. Therefore, memory 30 is capable of storing character codes of the characters printed on the two documents 12 and 14 as read by both the MICR read head 22 and OCR read head 24 and their circuits 26 and 28.

The data stored in memory 30 is forwarded via line 39 and line 41 to a register 40 which is capable of storing two character codes of data. The data is read from the memory 30 in a first in, first out basis usually alternating between a MICR buffer and an OCR buffer. Thus, the MICR and OCR character codes are alternately read into the register 40 so that at any given time the register 40 will contain binary data representing an OCR and MICR read character code. It should be noted that absent the reading of extraneous markings by the OCR read head 24, the two sets of binary character codes in the register 40 will represent the same character read by the MICR and OCR circuits 26 and 28.

The register 40 is a shift register so that a first portion 42 of the register 40 will contain character data used in one mode, i.e. OCR, while a second portion 44 will contain character data read in another mode, i.e. MICR. The character codes in the first and second portions 42 and 44 of the register 40 are forwarded via lines 43 and 45 to a compare circuit 46 and to separate decode circuits via lines 47 and 49 shown as OCR decode circuit 48 and MICR decode circuit 50.

The compare circuit 46 compares the character codes contained in the first and second portions 42 and 44 of the register 40 to provide a correspondence or non-correspondence output to edit logic 52. The decode circuits 48 and 50 also provide output to the edit logic 52.

When documents such as first document 12 and second document 14 are carried by the document transport mechanism 16 to a point where the documents leading edge is sensed by the document presence sensor, a transport document presence control 54 is signaled via line 53 to enable the MICR recognition circuit 26 via line 55 to recognize the characters on the document and forward the representative character codes to either buffer 32 or buffer 34 of the memory 30.

The document presence control 54 also operates via line 57 a document and buffer area control 56 which enables via line 59 a write address and access control 58. By activating write control 58 the control 58 enables the memory 30 via line 63 so that the character codes may be received in the buffer 32 and 34 from the MICR recognition circuit 26.

The document and area buffer control 56 also is connected to the OCR recognition circuit 28 via line 61 for enabling this circuit after a suitable time delay dependent on the distance X between the sensor 20 and OCR read head 24 and the speed of the transport mechanism 16.

If, for example, the first document 12 is being sensed, write control 58 may cause the data recognized by the recognition circuits 26 and 28 to be read into buffers 32 and 36, respectively. Once the document 12 is past the MICR read head 22, write control 58 will cause the memory 30 to begin storing character codes in MICR buffer 34 when the second document 14 passes the MICR read head 22. Once the document 12 is past the OCR read head 24, editing read out of buffers 32 and 36 will occur. Later write control 58 will cause memory 30 to begin storing character codes in OCR buffer 38 when the second document 14 passes the OCR read head 24.

Hence, write control 58 causes the data from successive documents such as the first document 12 and second document 14 to be written into buffers 32 and 34 for MICR character codes and causes data from successive documents to be written into OCR buffers 36 and 38.

Since the OCR reading of the character codes occurs at a time delay from the MICR reading, document and buffer area control 56 might actually activate write control 58 to be writing OCR data from the first document 12 into, for example, buffer 36, while MICR data from document 14 is writing into the other MICR buffer 34. Since the delay is less than the period between two documents, it is obvious that all MICR and OCR character codes from the document 12 will appear simultaneously in corresponding buffers 32 and 36 and later all codes from document 14 will appear simultaneously in buffers 34 and 38.

As mentioned above, the buffers have the capacity to accommodate all character codes from a single document. The character codes are written into memory as read and recognized by the MICR read head 22 and OCR read head 24 and their circuits 26 and 28. When the last character code is written into one of the buffers, the remaining space in the buffer area is filled with characters representing spaces. More than one space code indicates that the reading of characters on that particular document has been completed.

An MICR character read has the highest priority and will initiate an MICR memory write cycle. An OCR character read is next priority and will initiate an OCR memory write cycle. Characters are written sequentially and read in the same order.

To affect a read out from the memory 30, document and buffer area control 56 operates a read address and access control 60 via line 65 which reads out character codes individually from one of the buffers followed by a corresponding character code from the corresponding buffer. Read control 60 is connected to memory 30 via line 67.

Read control 60 will alternate access of buffers 32 and 36, and buffer 34 and 38 to read single character codes out in succession to the register 40. Thus, the MICR and OCR character codes for any given character is stored in register 40. The character codes from each of the reading formats is initially compared by compare circuit 46 and decoded by respective decode circuits 48 and 50 and the results are forwarded to edit logic 52.

Edit logic 52 operates certain prescribed edit functions on the character codes to cause selection of one or the other of the MICR or OCR character codes. A "USE OCR" edit function will be dictated upon the comparison of selected OCR and MICR symbols on the documents. This function is initiated on a symbol match of an OCR symbol with the next MICR symbol in sequence. If there is no symbol match, an OCR symbol one character in advance of the MICR symbol will be used. In this case, a "REPEAT OCR" read is executed to correct the character sequence. While "USE OCR" is in effect, each MICR reject will be replaced by an OCR character except that OCR rejects, dash or space character codes will not replace a MICR character. For example, if the MICR decode circuit 50 decodes the reject code, the edit logic 52 may force a "SUBSTITUTE OCR" edit function output to data output gating logic 62.

When "USE OCR" is not in effect, OCR reject, dash and space character codes which are not equal to the MICR character codes will be skipped from the final sequence by executing an "OCR SKIP" function of the edit logic 52. By this means extraneous OCR characters may be deleted.

The edit logic 52 can operate read control 60 via line 64 to force an OCR skip or OCR repeat mode.

When "USE OCR" is in effect a non compare between a character code of MICR and a character code of OCR may result in a reject code delivered to output line 66.

"USE OCR" is disabled after the above case and also in the following cases when no reject is forced:
1. A non compare where the previous compare with the last MICR code was a space code.
2. Two OCR reject codes occur in succession.
3. An OCR space code does not compare with a MICR space code.

"USE OCR" may be resumed again on a subsequent symbol match.

In all other cases it is preferred that MICR data codes be read as the final output indicated by line 66. Thus, edit logic 52 operates gating logic 62 via line 72 to provide the appropriate data from register 40 via line 70 to be outputted on line 66.

As mentioned above, all character codes appear in sequence in the buffers 32, 34, 36, and 38 of the memory 30 followed by space codes to fill the buffers. These codes will be sequenced into register 40 and when the edit logic 52 detects two sequential MICR space codes an "end of document" is signaled.

Figure 2:
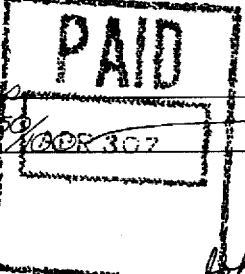
FIG. 2 is an example of a first bank check read by the system.

Edit function 52 also provides for an unedited mode affected by a jumper in the logic 52 so that the character codes are outputted at the character output 66 in the same order as read. First an OCR character code is outputted then an MICR character code follows until two successive MICR space codes are detected which will terminate data output for the particular document read. Typical computer data listings in the unedited mode and in normal edited mode are shown below for comparison. Referring to FIG. 2, illustrating first document 12, the unedited and edited mode of the characters would appear as follows:

---

Unedited Mode
,ı",ı" 005566660000000000000 ,ı" ,ı" ||' ||'55990033--881100
|: |: 004455000011110011 |: |:
Edited Mode
,ı" 0566000000 ,ı" ||'5903-810 |:045001101|:

---

The MICR recognition circuit 26 is generated at the start of each document data output. The jumper option in the edit logic 52 allows space codes to be deleted in normal editing mode output.

From reviewing the various functions illustrated in the diagram of edit logic 52, it can be appreciated that the following rules have been implemented.

The MICR character code read is the character outputted at 66 unless a "USE OCR" is set. Except prior to outputted first character code, the reading of the dollar symbol (i.e. ,ı" ) by the OCR read head 24 will be outputted and cause "USE OCR" to be set if the MICR read head 22 cannot read the dollar symbol.

"USE OCR" will also be set if the OCR read head 24 reads the dollar, account number or transit number symbols (i.e. ,ı" , ||' , |: ) and is also read by the MICR read head 22. This may occur for either an in phase character match or else an OCR character one character in advance of the MICR character. In the latter case, a "REPEAT OCR" read is executed to correct the character code sequence.

"USE OCR" is also reset unconditionally if it is not in an edit mode or not output mode. It is also reset on a non-compare where a misread is detected. In the case of a misread, one reject character output is forced via line 68 connected editing logic 52 and register 40. "USE OCR" may also be reset on a con-compare following a MICR space, two OCR character rejects in a row, or an OCR space where the MICR read head 22 does not detect a space in which case the MICR character is outputted and no reject of the character code is forced.

While "USE OCR" is set, each MICR reject character will be replaced in the output by the OCR character read in corresponding character sequence, except an OCR reject, dash or space will never be substituted for the MICR character code.

OCR reject, dash or space character codes not equal to the MICR character codes read will be dropped from character sequence when "USE OCR" is reset. If no more than one OCR character code is erroneously dropped from proper sequence, a "REPEAT OCR" may recover "USE OCR" again at the next significant symbol match.

As mentioned above, the buffers 32, 34, 36, and 38 are filled with space codes at the end of reading all of the character codes of each document. Thus, two MICR space codes in succession, or an MICR character count of 56 will terminate the output for any particular document.

Figure 3:
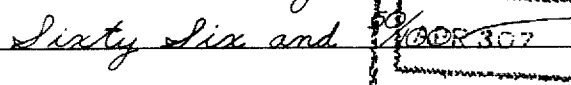
FIG. 3 is an example of a second bank check read by the system.

Referring to the bank check example FIG. 3, the editing logic functions are described below. The character sequence assumed stored for MICR where S denotes space code and R denotes reject is:

⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯
ı⁚0002000000,ı⁚S∥⁚5903-810S⌊⁚0450R1101⌊⁚ SS
⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯

It is assumed that MICR O is rejected because of a small extraneous magnetic particle imbedded in paper.

The assumed OCR data stored is:

⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯
ı⁚ 0002000000 ,ı⁚ 2SRRRSRSR5903-810RS⌊⁚ R4R001101⌊⁚ SS
⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯

"USE OCR" is put in effect initially because both MICR and OCR compare on reading the first ⁚ı⁚ symbol. All ten numerals and the last ⁚ı⁚ also compare and the MICR characters as read are outputted. The MICR space code is next which does not compare with the OCR read 2 (not magnetic ink). The OCR code is not substituted for the MICR space, and a forced reject is inhibited because it is a MICR space. The resultant character code output is a space.

The next MICR code is a ∥⁚ symbol which does not compare with OCR space. Two logic rules cause the "USE OCR" to end. The MICR ∥⁚ code is outputted and the OCR space code is skipped. The next OCR reject code (an optical 7 not E13B Font) is also skipped before going ahead with a comparison of the next MICR character. Similarly 6 more reject or space codes are skipped before the MICR 5 is compared with the OCR 5 which is not skipped. Although "USE OCR" is still not in effect, the MICR and OCR are again in proper phase comparison and continue this way to the — location. The OCR — is not skipped because it compares with the MICR — . The MICR characters output in this area because "USE OCR" is not in effect.

Coming to a MICR space code, the corresponding OCR code is a reject that is skipped. The next OCR is a space which is also skipped. Then the OCR ⌊⁚ compares with the MICR ⌊⁚ and "USE OCR" is again put into effect. The next MICR O is outputted even though the OCR had rejected that character. MICR characters continue to be outputted and "USE OCR" remains in effect up to the MICR reject code. At this point the OCR read O is substituted for the MICR reject in the final output. For the remainder of the document MICR codes compare with OCR codes and are outputted as final characters. A second MICR space code in succession terminates the output.

The net result of this logic is that all MICR codes as read were the final output, except the one MICR reject code was replaced by an OCR read O code; thus the entire document was read correctly.

Changes may be made in the construction and arrangement of the parts of elements of the embodiments as described herein within departing from the spirit or scope of the invention defined in the following claims.

What is claimed is:

1. A character recognition system for selectively reading and identifying a plurality of characters printed in magnetic ink on documents, the documents being bank checks and the like, the documents transported on a document transport mechanism, the system comprising:
   a magnetic ink character recognition, i.e. MICR read head and recognition circuit disposed adjacent the document transport mechanism for reading the magnetic ink characters on the document and providing a character recognition code for each character read;
   an optical character recognition, i.e. OCR read head and recognition circuit disposed adjacent the document transport mechanism and positioned at a fixed distance downstream from the MICR read head, the OCR read head and circuit optically reading the magnetic ink characters on the document and providing a character recognition code for each character read;
   a memory having write and read access control with document and buffer area control connected to the MICR and OCR circuitry, the memory having the capacity to store all of the OCR and MICR character recognition codes for a single document; and
   edit logic connected to the memory for comparing corresponding character codes from the memory and putting out a final character code or skipping and repeating character codes to achieve a character correspondence.

2. The system as described in claim 1 wherein the memory includes a first and second MICR buffer connected to the MICR circuit and a first and second OCR buffer connected to the OCR circuit, the four buffers of the memory each having the capacity to store the character codes representing the characters to be used for a single document.

3. The system as described in claim 1 further including a document presence sensor disposed adjacent the document transport system for sensing the documents being transported thereby and a document presence control connected to and activated by the document presence sensor when the documents are sensed.

4. The system as described in claim 1 further including a register connected to the memory and the edit logic, the register having a first section for receiving the OCR character codes from the memory and a second section for receiving the MICR character codes from the memory, the edit logic connected to the register for comparing corresponding character codes from the first section and the second section of the register and putting out a final character code.

5. A character recognition system for selectively reading and identifying a plurality of characters printed in magnetic ink on documents, the documents being bank checks and the like, the documents transported on a document transport mechanism, the system comprising:

- a document presence sensor disposed adjacent the document transport mechanism for sensing the document being transported thereby;
- a document presence control connected to and activated by the document presence sensor when the documents are sensed;
- a magnetic ink character recognition, i.e. MICR read head and recognition circuit disposed adjacent the document transport mechanism for reading the magnetic ink characters on the document and providing a character code for each character read, the MICR read head and circuit enabled by the document presence control when the documents are sensed;
- an optical character recognition, i.e. OCR read head and recognition circuit disposed adjacent the document transport mechanism and positioned at a fixed distance downstream from the MICR read head, the OCR read head and circuit optically reading the magnetic ink characters on the document and providing a character recognition code for each character read, the OCR read head and circuit enabled by the document presence control when the documents are sensed;
- a memory having write and read access with document and buffer area control connected to the MICR and OCR circuitry, the memory having the capacity to store all of the MICR and OCR character recognition codes for a single document;
- a register connected to the memory, the register having a first section for receiving the OCR character codes from the memory, and a second section for receiving the MICR character codes from the memory; and
- edit logic connected to the register for comparing corresponding character codes from the first section and the second section of the register and putting out a final character code and connected to the memory for skipping and repeating character codes to achieve character correspondence.

6. The system as described in claim 5 wherein the memory includes a first and second MICR buffer connected to the MICR circuit and a first and second OCR buffer connected to the OCR circuit, the four buffers of the memory each having the capacity to store the character codes representing the characters to be used for a single document.

* * * * *